United States Patent
Duggan et al.

(10) Patent No.: US 11,280,162 B2
(45) Date of Patent: Mar. 22, 2022

(54) POWER GENERATION USING PRESSURE DIFFERENTIAL BETWEEN A TUBULAR AND A BOREHOLE ANNULUS

(71) Applicants: Andrew Duggan, Houston, TX (US); Christopher Ryan Hern, Porter, TX (US); Daniel Ewing, Katy, TX (US)

(72) Inventors: Andrew Duggan, Houston, TX (US); Christopher Ryan Hern, Porter, TX (US); Daniel Ewing, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/234,936

(22) Filed: Dec. 28, 2018

(65) Prior Publication Data

US 2020/0208498 A1    Jul. 2, 2020

(51) Int. Cl.
*E21B 41/00*  (2006.01)
*E21B 34/10*  (2006.01)
*H02K 35/02*  (2006.01)

(52) U.S. Cl.
CPC .......... *E21B 41/0085* (2013.01); *E21B 34/10* (2013.01); *H02K 35/02* (2013.01)

(58) Field of Classification Search
CPC ...... E21B 41/0085; E21B 34/10; H02K 35/02
See application file for complete search history.

(56) References Cited

U.S. PATENT DOCUMENTS 5,149,984 A    9/1992  Schultz et al.
5,696,413 A   12/1997  Woodbridge et al.
5,839,508 A   11/1998  Tubel et al.
6,791,205 B2   9/2004  Woodbridge
(Continued)

FOREIGN PATENT DOCUMENTS

WO    2006085869 A1    8/2006
WO    2016094748 A1    6/2016

OTHER PUBLICATIONS

International Search Report and Written Opinion for International Application No. PCT/US2019/059970; International Filing Date Nov. 6, 2019; dated Apr. 8, 2020; 9 pages.
(Continued)

*Primary Examiner* — Taras P Bemko
*Assistant Examiner* — Yanick A Akaragwe
(74) *Attorney, Agent, or Firm* — Cantor Colburn LLP

(57) ABSTRACT

An apparatus for generating power includes a fluid chamber configured to receive borehole fluid, one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume, the first conduit and the second conduit extending from a tubular conduit to an annulus. The apparatus includes a switching assembly configured to alternate between a first operating state where the first volume is in fluid communication with the annulus and a second operating state where the first volume is in fluid communication with the tubular conduit, to alternate a direction of differential pressure between the first volume and the second volume and cause the magnetic shuttle to move in a reciprocating motion and generate an electric current.

20 Claims, 6 Drawing Sheets

(56) References Cited

U.S. PATENT DOCUMENTS

| | | | |
|---|---|---|---|
| 7,242,103 B2 | 7/2007 | Tips | |
| 9,528,349 B2 * | 12/2016 | Zimmerman | ....... E21B 41/0085 |
| 2003/0116969 A1 | 6/2003 | Skinner et al. | |
| 2006/0099093 A1 | 5/2006 | Brennan, III et al. | |
| 2010/0000731 A1 | 1/2010 | Gordon et al. | |
| 2011/0030976 A1 | 2/2011 | King | |
| 2011/0057449 A1 | 3/2011 | Marya et al. | |
| 2011/0148656 A1 | 6/2011 | Hudson et al. | |
| 2011/0155393 A1 * | 6/2011 | Loretz | ....................... F03G 7/04 |
| | | | 166/374 |
| 2012/0312548 A1 * | 12/2012 | Swist | ..................... E21B 21/10 |
| | | | 166/373 |
| 2014/0041876 A1 | 2/2014 | Flockenstein et al. | |
| 2014/0076560 A1 | 3/2014 | Kenyon et al. | |
| 2016/0130910 A1 | 5/2016 | Gonzalfz et al. | |
| 2016/0341002 A1 | 11/2016 | McKitrick, III | |
| 2018/0306003 A1 | 10/2018 | Purkis et al. | |
| 2020/0347702 A1 | 11/2020 | Duggan et al. | |

OTHER PUBLICATIONS

International Search Report for International Application No. PCT/US2020/021418, International Filing Date: Mar. 6, 2020, dated Jul. 3, 2020, 7 pages.

Written Opinion for International Application No. PCT/US2020/021418, International Filing Date: Mar. 6, 2020, dated Jul. 3, 2020, 7 pages.

International Search Report for International Application No. PCT/US2020/024847, International Filing Date Mar. 26, 2020, dated Jul. 13, 2020, 6 pages.

Written Opinion for International Application No. PCT/US2020/024847, International Filing Date Mar. 26, 2020, dated Jul. 13, 2020, 6 pages.

\* cited by examiner

POWER GENERATION USING PRESSURE DIFFERENTIAL BETWEEN A TUBULAR AND A BOREHOLE ANNULUS

BACKGROUND

In the resource recovery industry, various downhole tools are employed for purposes such as flow control, drilling, directional drilling and formation property measurements. Examples of such tools include logging-while-drilling (LWD) and measurement-while-drilling (MWD) tools. Some downhole tools generally require electrical power to operate, which can be provided by surface power supplies or by downhole power generators or power supplies.

SUMMARY

An embodiment of an apparatus for generating electrical power includes at least one housing assembly having a housing located at a tubular configured to be disposed in a borehole in a resource bearing formation, the tubular including a tubular conduit through which a borehole fluid is circulated, the housing including a fluid chamber configured to receive the borehole fluid. The apparatus also includes one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume, the first conduit and the second conduit extending from the tubular conduit to an annulus in the borehole. The apparatus also includes at least one switching assembly configured to alternate between a first operating state and a second operating state, where the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state. The switching assembly is configured to alternate between the first operating state and the second operating state to alternate a direction of a differential pressure between the first volume and the second volume and cause the magnetic shuttle to move in a reciprocating motion and generate an electric current in the one or more conductive coils.

An embodiment of a method of generating electrical power includes deploying a power generation assembly with a tubular in a borehole in a resource bearing formation, the tubular including a tubular conduit through which a borehole fluid is circulated, the power generation assembly including at least one housing assembly having a housing located at the tubular, the housing including a fluid chamber configured to receive the borehole fluid, one or more conductive coils surrounding the fluid chamber, and a reciprocating magnetic shuttle disposed in the fluid chamber and dividing the fluid chamber into a first volume and a second volume. The method also includes connecting a first conduit to the first volume, and connecting a second conduit to the second volume, the first conduit and the second conduit extending from the tubular conduit to an annulus in the borehole, and operating at least one switching assembly to alternate between a first operating state and a second operating state, where the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state. The method further includes causing the magnetic shuttle to move within the fluid chamber in a reciprocating motion by alternating between the first operating state and the second operating state to alternate a direction of a differential pressure between the first volume and the second volume, and generating an electric current in the one or more conductive coils.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Disclosed are apparatuses, systems and methods for generating electrical power in a downhole environment. An embodiment of a power generation assembly is configured to be disposed in a borehole with a tubular (e.g., attached to or integral with a tubular such as a drill pipe segment or a power sub, liner joint, tool mandrel or any other suitable component that can be deployed downhole) and includes a magnetic shuttle disposed in a fluid chamber and moveable between a first end and a second end the fluid chamber. One or more conductive coils are disposed on or at least proximate to the fluid chamber such that at least a portion of the coils are within a magnetic field generated by the magnetic shuttle.

The power generation assembly is in selective fluid communication with both fluid in an annular region of the borehole and fluid flowing through the tubular. Pressure differentials between the annulus and the tubular are utilized to move the magnetic shuttle in a reciprocating motion. The reciprocating motion of the magnetic shuttle causes electric current in the coils, which can be used to supply power to one or more downhole components.

Embodiments described herein provide a number of advantages and technical effects. Embodiments allow for generation of power in a compact tool or device using existing differential pressures that occur in typical energy industry operations. The embodiments can be utilize to provide power and/or supplement other power sources to increase reliability of power supplies to downhole components. Generating power downhole has been a challenge due to limitations in battery technology, size of equipment, deviated well geometries, and a hazardous environment. Embodiments described herein provide for a relatively simple and compact way to supply power that is effective in downhole environments and can be included in existing downhole systems with relatively small changes in size and complexity.

Figure 1:
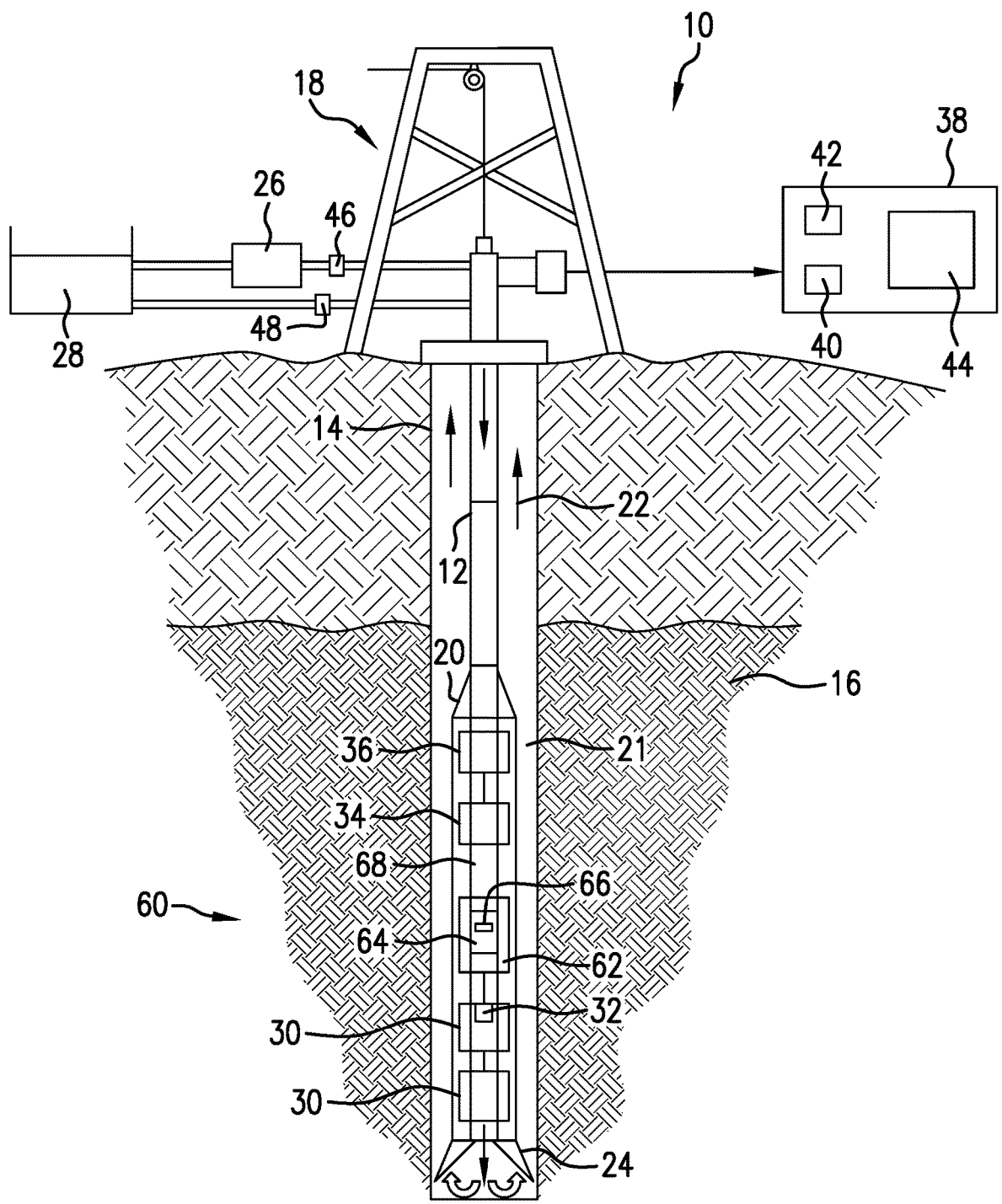
FIG. 1 depicts an embodiment of a system for performing an energy industry operation, the system including an electrical power generation assembly.

FIG. 1 shows an embodiment of a system 10 for performing an energy industry operation (e.g., drilling, measurement, stimulation, well construction, well completion and/or production). The system 10 includes a borehole string 12 that is shown disposed in a well or borehole 14 that is drilled to penetrate at least one resource bearing formation 16 during a drilling or other downhole operation. As described herein, "borehole" or "wellbore" refers to a hole that makes up all or part of a drilled well. It is noted that the borehole 14 may include vertical, deviated and/or horizontal sections, and may follow any suitable or desired path. As described herein, "formations" refer to the various features and materials that may be encountered in a subsurface environment and surround the borehole 14.

The borehole string 12 is operably connected to a surface structure or surface equipment such as a drill rig 18, which includes or is connected to various components such as a surface drive or rotary table for supporting the borehole string 12, rotating the borehole string 12 and lowering string sections or other downhole components. In one embodiment, the borehole string 12 is a drill string including one or more drill pipe sections that extend downward into the borehole 14, and is connected to a bottomhole assembly (BHA) 20.

The borehole string 12 includes or forms a tubular through which fluid 22 is circulated into the borehole 14. In operation, in one embodiment, the fluid 22 is injected into the tubular and/or the borehole string 12 by the surface equipment 18, flows through the tubular and returns to the surface through an annulus 21 between the borehole string 12 and the borehole wall (or casing if the borehole or borehole section is cased). The fluid 22 may be any type of fluid, such as drilling fluid or stimulation fluid, and may include formation fluid such as water, gas and/or oil that enters the borehole 14.

For example, the surface equipment 18 includes a drilling rig and the fluid 22 includes drilling mud injected into the tubular to facilitate a drilling and/or measurement (e.g. logging while drilling) operations. The BHA 20 includes a drill bit 24, which in this example is driven from the surface, but may be driven from downhole, e.g., by a downhole mud motor. A pumping device 26 may be located at the surface to circulate the fluid 22 from a mud pit or other fluid source 28 into the borehole 14 as the drill bit 24 is rotated.

In the embodiment of FIG. 1, the system 10 shown is configured to perform a drilling operation, and the borehole string 12 is a drill string. However, embodiments described herein are not so limited and may have any configuration suitable for performing an energy industry operation that includes a downhole power generator. For example, the system 10 may be configured as a stimulation system, such as a hydraulic fracturing and/or acidizing system.

The system 10 may include one or more of various tools 30 configured to perform selected functions downhole such as performing downhole measurements, facilitating communications, performing stimulation operations and/or performing production operations. For example, one or more of the downhole tools 30 may include one or more sensors 32 for performing measurements such as logging while drilling (LWD) or measurement while drilling (MWD) measurements. Other tools include, e.g. intelligent production tools, liner setting tools, and tools for logging various information while completing construction of a borehole.

In one embodiment, the system 10 includes a telemetry assembly such as a communication module 34 (e.g., a telemetry sub) for communicating with the surface and/or other downhole tools or devices. In one embodiment, the communication module is configured as a mud pulse telemetry (MPT) device including a pulser (not shown) that generates pressure signals through the fluid, but is not so limited. The communication module 34 may be configured to perform any suitable type of wired or wireless communication.

One or more downhole components and/or one or more surface components may be in communication with and/or controlled by a processor such as a downhole processor 36 and/or a surface processing unit 38. In one embodiment, the surface processing unit 38 is configured as a surface control unit which controls various parameters such as rotary speed, weight-on-bit, fluid flow parameters (e.g., pressure and flow rate) and others. The surface processing unit 38 (or other processor) can also perform monitoring and communication functions, e.g., to gather tool status information and information regarding borehole conditions.

The surface processing unit 38 (and/or the downhole processor 36) may be configured to perform functions such as controlling drilling and steering, controlling the flow rate and pressure of borehole fluid, transmitting and receiving data, processing measurement data, and/or monitoring operations of the system 10. The surface processing unit 38, in one embodiment, includes an input/output device 40, a processor 42, and a data storage device 44 (e.g., memory, computer-readable media, etc.) for storing data, models and/or computer programs or software that cause the processor to perform aspects of methods and processes described herein.

Surface and/or downhole sensors or measurement devices may be included in the system 10 for measuring and monitoring aspects of an operation, fluid properties, component characteristics and others. In one embodiment, the surface processing unit 38 and/or the downhole processor 36 includes or is connected to various sensors for measuring fluid flow characteristics. For example, the system 10 includes fluid pressure and/or flow rate sensors 46 and 48 for measuring fluid flow into and out of the borehole 14, respectively. Fluid flow characteristics may also be measured downhole, e.g., via fluid flow rate and/or pressure sensors in the borehole string 12.

Some downhole components, such as the tools 30, the communication module 34 and/or the downhole processor 36, need electrical power to operate. Such power can be transmitted from the surface via a cable, or provided by a downhole power generation system as discussed herein.

The system 10, in one embodiment, includes a downhole power generation assembly 60. The power generation assembly 60 may be incorporated into the drill string 12 as part of a power generation module or sub, or incorporated as part of a component or tool to supply power to thereto.

The power generation assembly 60 includes a housing 62 that defines or includes a fluid chamber 64. The fluid chamber 64 houses a reciprocating magnetic shuttle 66. The magnetic shuttle 66 is caused to move axially along the fluid chamber past one or more conductive coils (e.g., conductive wire windings) that extend around the fluid chamber 64 and are positioned such that the moving magnetic field of the magnetic shuttle 66 causes electric currents to be induced therein. The magnetic shuttle 66, in one embodiment, is driven in a reciprocating manner by utilizing the pressure differential between fluid in the annulus 21 and fluid flowing through a conduit 68 in the tubular (a tubular conduit).

In one embodiment, the magnetic shuttle 66 divides the fluid chamber 64 into opposing volumes that are selectively and alternatingly connected to the annulus 21 or the tubular conduit 68. Each volume is connected to a fluid conduit that extends between the annulus 21 and the tubular conduit 68, so that pressure from the annulus 21 is applied to one volume while pressure from the tubular conduit 68 is applied to the second volume. The differential between the pressure in the volumes causes pressure to be applied in a first direction so that the magnetic shuttle 66 moves in the first direction. Once the magnetic shuttle 66 has moved by the conductive coils, a switching assembly (including, e.g., a series of valves) switches the applied pressure direction to send the magnetic shuttle 66 in a second direction opposite to the first direction. The switching assembly alternates between applying pressure in the first direction and the second direction, which results in a reciprocating (back-and-forth) movement that creates repeating pulses of electric current at high speed. The electric current can be used to power downhole components such as electrical components and sensors, and/or recharge batteries or other energy storage devices.

Figure 2:
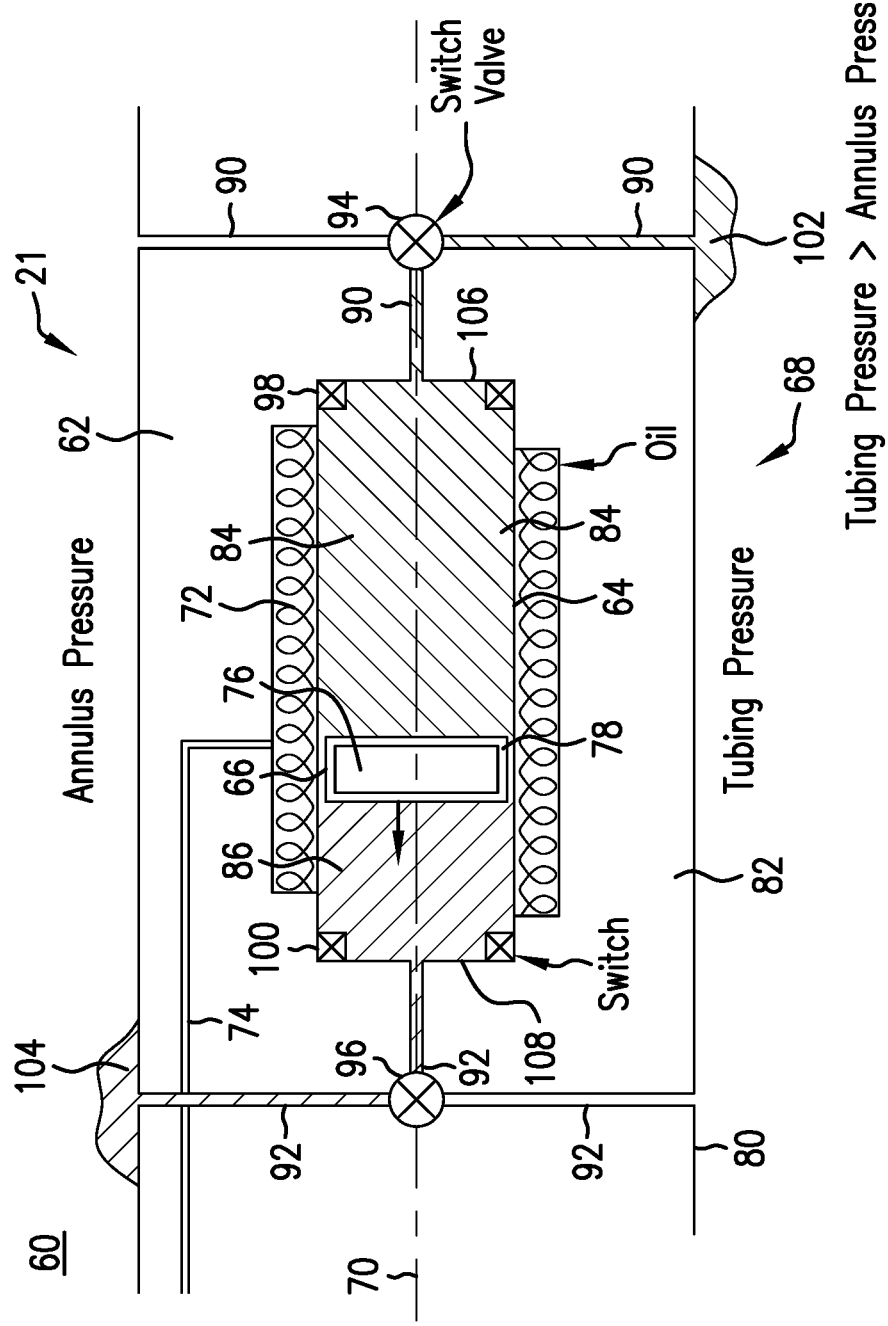
FIG. 2 depicts an operating state of the power generation assembly of FIG. 1 in which a magnetic shuttle is driven in a first direction.
Figure 3:
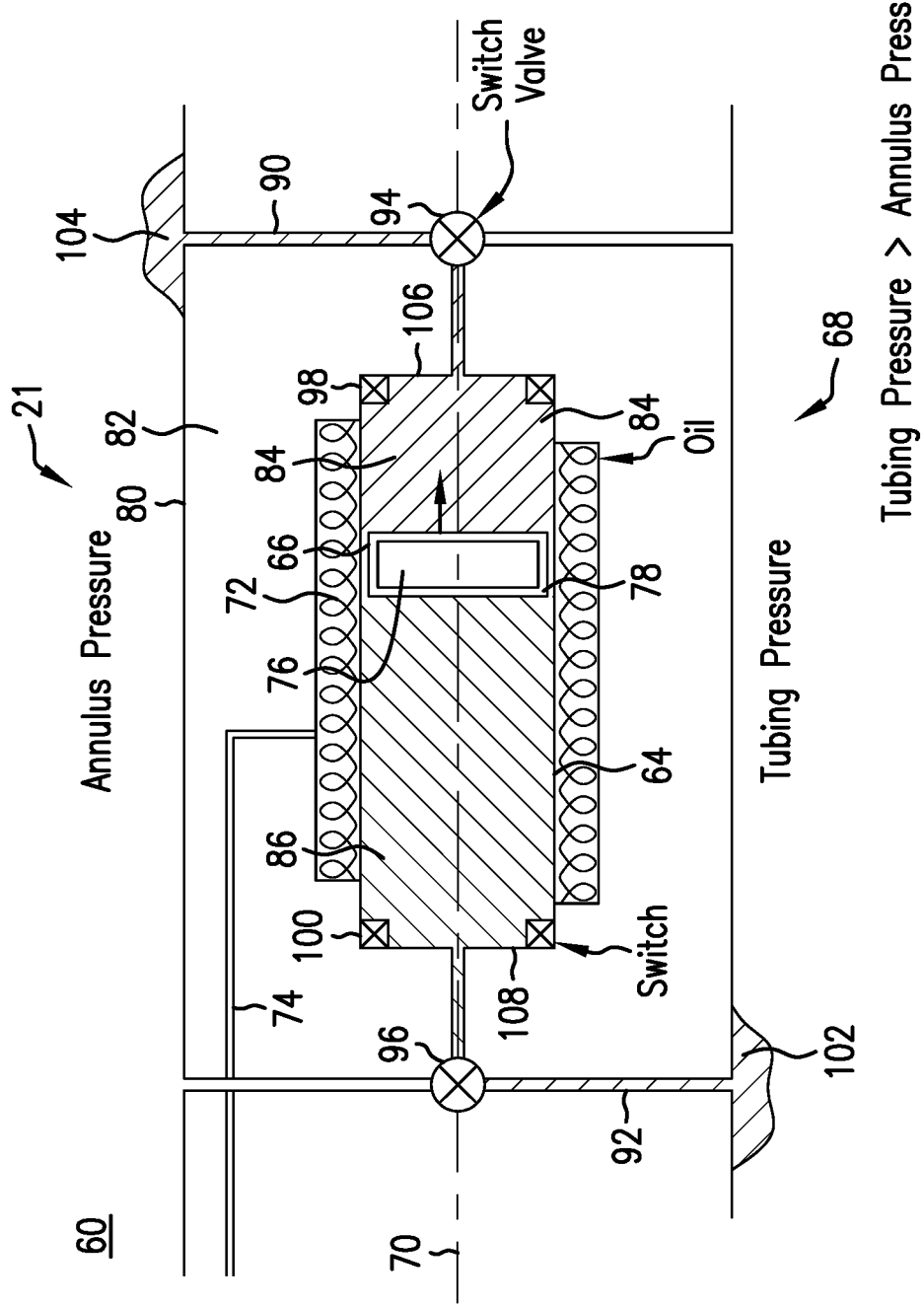
FIG. 3 depicts an operating state of the power generation assembly of FIGS. 1 and 2 in which the magnetic shuttle is driven in a second direction.

FIGS. 2 and 3 depict an embodiment of the power generation assembly 60. The power generation assembly 60 includes the fluid chamber 64, which extends along a primary axis 70. The primary axis 70, as shown, is offset from the central axis of the tubular conduit 68, however the primary axis 70 can be in-line with the central axis (e.g., with a fluid bypass running around the fluid chamber 64). The magnetic shuttle 66 is allowed to move in directions parallel to the axis 70 due to applied pressure differentials. As noted above, the power generation assembly 60 includes one or more conductive coils 72, in which an electric current is induced by movement of the magnetic shuttle 66. The conductive coils 72 may be connected to an electrical connector 74 to transmit electric power to other components.

Although the conductive coils 72 are discussed as being disposed on the outside of the fluid chamber 64, embodiments described herein are not so limited. For example, the conductive coils may be disposed within the fluid chamber 64, with pressure sealed electrical leads extending to the outside of the fluid chamber 64.

The fluid chamber 64 may be of any suitable size and shape that allows the magnetic shuttle 66 to move in opposing directions. For example, the fluid chamber 64 is a cylindrical chamber having a longitudinal axis that corresponds to the axis 70, and has a cylindrical magnetic shuttle shaped and sized to maintain a selected clearance between the magnetic shuttle 66 and the interior surfaces of the fluid chamber 64. The clearance is selected to prevent a significant amount of fluid from passing between the opposing volumes in the fluid chamber, or otherwise form a restriction between opposing volumes of the fluid chamber 64 that is sufficient to create a sufficient pressure differential.

The magnetic shuttle 66 includes or is formed by a magnetic component such as a permanent magnet 76 (although the magnetic component may be a temporary magnet or electromagnet). The magnetic shuttle 66 may be made entirely of the permanent magnet 76, or include additional components such as a shuttle housing 78. In addition, the magnetic shuttle 66 and/or the fluid chamber 64 may include other components to facilitate operation, such as one or more bearings, one or more bushings and/or one or more seals. For example, the magnetic shuttle 66 may be surrounded by an o-ring or other suitable type of seal to prevent fluid bypass while the magnetic shuttle 66 is moving axially.

The power generation assembly 60 includes a housing 62 that includes or defines the fluid chamber 64. The housing 62 may be a separate housing that is fixedly disposed relative to a tubular 80 (e.g., a section of the borehole string 12, a pipe section or a module or sub). For example, a housing 62 may be attached to a wall 82 of the tubular 80 (e.g., on an inner surface of the tubular 80). In one embodiment, as shown in FIGS. 2 and 3, the housing 62 is integral with the wall 82. For example, the fluid chamber 64 is a bore or other cavity formed in the tubular wall 82.

The magnetic shuttle 66 divides the fluid chamber into opposing volumes, i.e., a first volume 84 that extends from one end of the fluid chamber 64 to the magnetic shuttle 66, and a second volume 86 that extends from an opposite end of the fluid chamber 64 to the magnetic shuttle 66.

The power generation assembly 60 includes at least one first port or conduit 90 that is connected to both the annulus 21 and the tubular conduit 68, and at least one second port or conduit 92 that is connected to both the annulus 21 and the tubular conduit 68. The first conduit 90 is also connected to the first volume via a first valve 94, which acts to selectively connect either the annulus 21 or the tubular conduit 68 in fluid communication with the first volume 84. Likewise, the second conduit 92 is connected to the second volume via a second valve 96, which acts to selectively connect either the annulus 21 or the tubular conduit 68 in fluid communication with the second volume 86.

Due to natural head losses of the borehole flow loop, the annulus 21 between the tubular 80 and the borehole wall (or casing) generally has a lower fluid pressure than the inside of the tubular 80. Accordingly, by connecting the first volume 84 to the annulus 21 and the second volume 86 to the tubular conduit 68 via the conduits 90 and 92, or vice versa, a pressure differential is established between the first volume 84 and the second volume 86 that drives the magnetic shuttle 66 along the axis 70.

Generally, the annulus 21 is described as having lower fluid pressure than the inside of the tubular 80. However, there may be instances where the fluid pressure in the annulus 21 is higher than that of the tubular. Embodiments described herein are equally applicable to such instances.

By connecting a high pressure flow from the tubular conduit 68 to the first volume 84 and a low pressure flow from the annulus 21 to the second volume 86, the magnetic shuttle 66 is driven in a first direction. Switching the high pressure flow to the second volume 86 and the low pressure flow to the first volume 84 using the valves 94 and 96 (e.g., by simultaneously controlling the valves 94 and 96 to switch direction) drives the magnetic shuttle 66 in a second, opposite direction. Switching in an alternating fashion causes the magnetic shuttle 66 to alternate between the first and second directions, resulting in alternating electric currents in the conductive windings 72.

In one embodiment, the power generation assembly 60 includes a switching assembly configured to operate the valves 94 and 96 to switch between applied differential pressure directions. For example, the switching assembly includes a first switch 98 and a second switch 100. Each of the switching devices in this example are toroidal switches that are actuated by hydraulic pressure, mechanical contact with the magnetic shuttle 66, proximity to the magnetic shuttle 66, by active control (e.g., electrical signals or commands) or by any other suitable means.

In one embodiment, the switching assembly omits the switches 98 and 100 and directly actuates the valves 94 and 96. For example, each valve 94 and 96 can be a hydraulically actuated valve that switches between high and low pressure flow.

The switching devices may be of any suitable type. For example, the switches 98 and 100 may be mechanically operated switches that actuate the valves 94 and 96 to switch between a high pressure flow and a low pressure flow. A "high pressure flow" refers to fluid being permitted by a valve to flow from the tubular conduit 68 to the fluid chamber 64, and fluid being prevented by the valve from flowing into the fluid chamber 64 from the annulus 21. A "low pressure flow" refers to fluid being permitted by a valve to flow from the annulus 21 to the fluid chamber 64, and fluid being prevented by the valve from flowing into the fluid chamber 64 from the tubular conduit 68.

In another example, the switches 98 and 100 can be magnetically actuated switches that actuate the valves 94 and 96 in response to the magnetic field of the magnetic shuttle 66 when the magnetic shuttle 66 advances to a location proximate to a switch. In a further example, the switches 98 and 100 can be pressure switches configured to actuate the valves 94 and 96 by an increase in pressure as the magnetic shuttle 66 is driven toward a switch.

Other components may be included to facilitate movement of the magnetic shuttle, such as springs located at opposing ends of the fluid chamber 64. The springs may be used to apply energy to the magnetic shuttle 66 and/or to actuate the switches 98 and 100.

In one embodiment, some of the electric power generated by the reciprocating movement of the magnetic shuttle 66 is utilized to operate components of the switching assembly and/or the power generation assembly 60. Various components can be included to operate the switches 98 and 100 and/or facilitate movement of the magnetic shuttle 66. For example, the switches 98 and 100 can be electrically actuated switches that simultaneously are actuated to control the valves 94 and 96 to switch the direction of the differential pressure in the fluid chamber 64. In another example, piezoelectric springs can be actuated via the switches 98 and 100 or otherwise actuated to increase the movement speed or acceleration of the magnetic shuttle 66, or otherwise enhance the overall amount of generated electricity.

Operation of the switches and other components of the power generation assembly 60 can be controlled by a controller or other processing device disposed with the power generation assembly (e.g., as part of a power generation sub or module) or disposed remotely at a surface or downhole location. For example, the connector 74 is utilized to transmit data and/or commands from a controller to operate switches or springs.

FIGS. 2 and 3 illustrate operating states of the power generation assembly 60 during operation and generation of electric power. FIG. 2 shows a first operating state, in which the first volume 84 is in fluid communication with high pressure fluid 102 from the tubular conduit 68, and the second volume 86 is in fluid communication with low pressure fluid 104 from the annulus 21. It is noted that "high pressure" and "low pressure" are intended to be relative terms and are not indicative of a specific pressure value.

In the first operating state, the pressure differential drives the magnetic shuttle 66 axially away from a first end 106 of the fluid chamber 64 toward a second end 108 of the fluid chamber 64. When the magnetic shuttle 66 contacts or is proximate to the second switch 100, or in response to a signal or command, both the first switch 98 and the second switch 100 are operated to control the first valve 98 and the second valve 100 to change the direction of the differential pressure and put the power generation assembly 60 in a second operating state. In one embodiment, the first and second switches 98 and 100 are operated at least substantially simultaneously.

As shown in FIG. 3, when the power generation assembly 60 is in the second operating state, the first volume 84 is in fluid communication with low pressure fluid 104 from the annulus 21, and the second volume 86 is in fluid communication with high pressure fluid 102 from the tubular conduit 68. When in this state, the magnetic shuttle 66 is driven toward the first end 106. The valves are again operated to switch the assembly to the first operating state.

The valves are operated to alternately switch between the first and second operating states. In this way, reciprocal motion of the magnetic shuttle 66 is realized, and an alternating current is generated in the conductive coils 72.

In the above embodiments, fluid pressure is transmitted by allowing annulus fluid 104 and tubular conduit fluid 102 to flow directly into the fluid chamber 64. However, the embodiments described herein are not so limited. In one embodiment, the fluid chamber 64 may be filled with a different fluid that is acted upon by pressure from the annulus and the tubular conduit.

Figure 4:
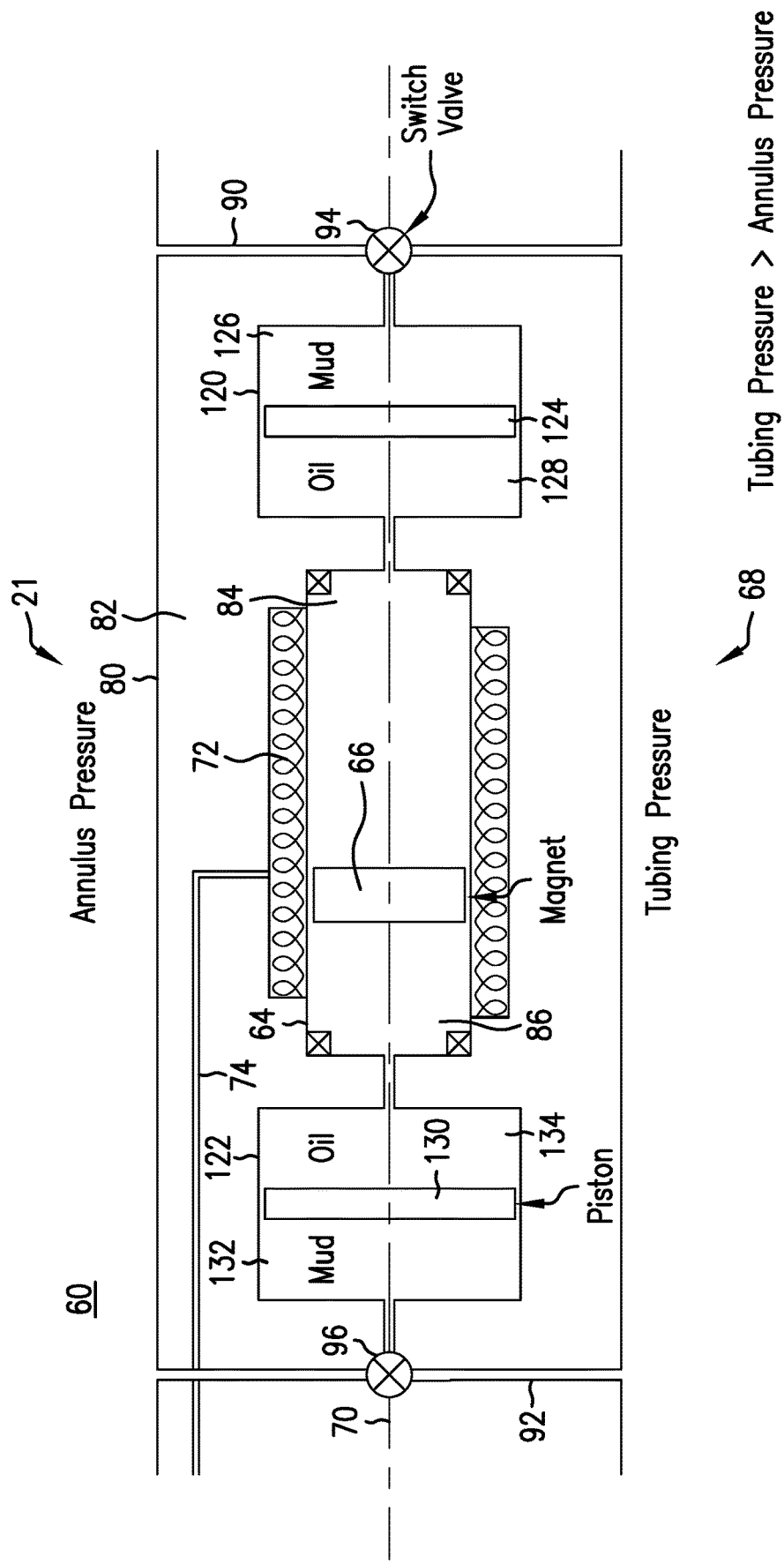
FIG. 4 depicts another embodiment of the power generation assembly of FIG. 1.

An example of the power generation assembly 60 that incorporates indirect pressure transmission is shown in FIG. 4. This example of the power generation assembly 60 is similar to the above embodiments, except that instead of borehole fluid entering the fluid chamber 64, fluid pressure is applied to a hydraulic fluid in the fluid chamber 64.

For example, the power generation assembly 60 includes secondary fluid chambers 120 and 122 in fluid communication with the first volume 84 and the second volume 86, respectively. One secondary fluid chamber 120 includes a moveable pressure piston 124 that separates the secondary fluid chamber into a first region 126 in fluid communication with borehole fluid (either fluid from the annulus 21 or fluid from the tubular conduit 68 depending on the position of the first valve 94), and a second region 128 in fluid communication with the fluid chamber 64. Likewise, another secondary fluid chamber 122 includes a moveable pressure piston 130 that separates the secondary fluid chamber 122 into a first region 132 in fluid communication with borehole fluid, and a second region 134 in fluid communication with the fluid chamber 64.

In this example, the fluid chamber 64 and the regions 128 and 134 are filled with a hydraulic fluid such as oil. It is noted that any suitable fluid may be used in the fluid chamber 64 and is not limited to the above example.

Figure 5:
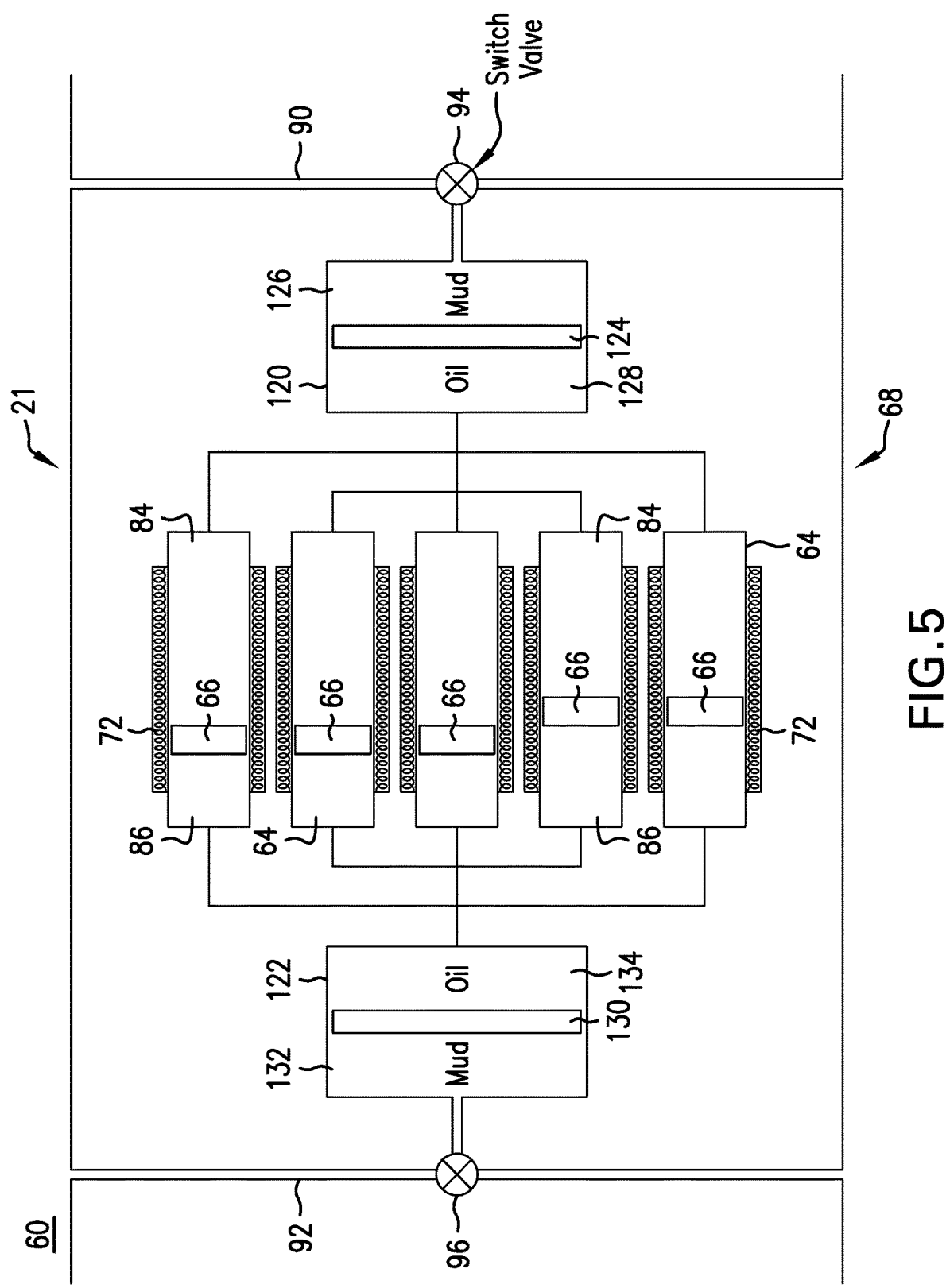
FIG. 5 depicts a further embodiment of the power generation assembly of FIG. 1.

Multiple power generation assemblies 60 and/or fluid chambers 64 can be operated in parallel or otherwise in combination to increase electrical output. For example, as shown in FIG. 5, a plurality of housing assemblies are connected to the conduits 90 and 92. Each housing assembly includes a respective housing 62, fluid chamber 64, conductive coils 72 and magnetic shuttle 66. In one embodiment, the housing assemblies are operated simultaneously as the switching assemblies alternatingly switch the direction of the pressure differential in each fluid chamber 64.

Although the fluid chambers (and the movement direction of the magnetic shuttle) are shown as generally parallel to one another, they are not so limited. Furthermore, the fluid chambers and the direction of movement of magnetic shuttles are not limited to any particular direction or path.

For example, the movement direction may be independent of the configuration of the tubular and can be a non-linear direction. In another example, multiple fluid chambers can be arrayed circumferentially around the tubular conduit 68. In a further example, the fluid chamber defines a curved path that follows a circumferential direction around the tubular conduit. The fluid chamber may extend completely around the tubular conduit, or extend partially and define an arc path that forms part of the circumference around the tubular conduit.

Other downhole conditions can be utilized to induce or facilitate reciprocal movement of the magnetic shuttle 66. For example, vibration can be utilized to cause reciprocating movement and/or enhance the movement caused by the switching assembly. The vibration may be naturally occurring vibration of the borehole string 12 and/or vibration from a vibrating (e.g., piezoelectric) component attached to the borehole string 12 and/or the housing 62. In one embodiment, the switches and/or valves can be operated to switch between operating states at a frequency that corresponds to frequencies of induced and/or naturally occurring vibrations.

Figure 6:
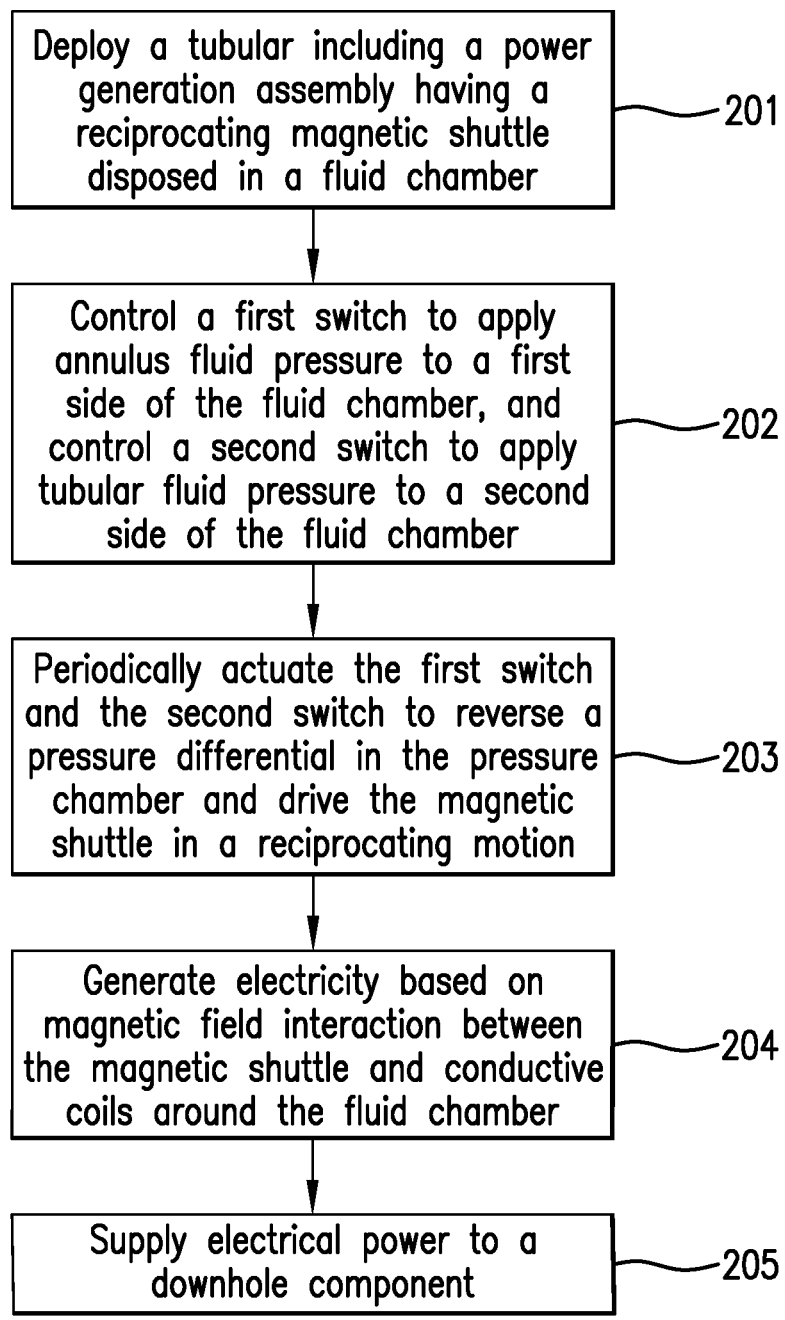
FIG. 6 is a flow chart for a method for generating electrical power in a downhole environment.

FIG. 6 illustrates a method 200 of performing an energy industry operation and generating power for one or more downhole components. The method 200 may be used in conjunction with the system 10, although the method 200 may be utilized in conjunction with any suitable type of device or system for which downhole electrical power is desired. The method 200 includes one or more stages 201-205. In one embodiment, the method 200 includes the execution of all of stages 201-205 in the order described. However, certain stages may be omitted, additional stages may be added, and/or the order of the stages may be changed.

Aspects of the method 200 may be performed by a processing device such as the downhole processor and/or the surface processing unit 38. For example, a processing device may be connected to a power generation assembly to control the switching assembly.

In the first stage 201, a tubular such as the drill string 12 is deployed and the borehole 14 is drilled to a desired location or depth. During drilling, borehole fluid 22 is pumped through the drill string 12 and the BHA 20.

In the second stage 202, the power generation assembly 60 is configured in an initial state in which the first volume 84 is in fluid communication with the annulus 21 so that low pressure fluid 104 in the annulus applies annulus fluid pressure to the first volume 84, and in which the second volume 86 is in fluid communication with the tubular conduit 68 so that high pressure fluid 102 in the tubular conduit 68 applies tubular fluid pressure to the second volume 86. The resulting differential pressure urges the magnetic shuttle 66 toward the first end of the fluid chamber 64.

In the third stage 203, the first switch 98 and the second switch 100 are periodically actuated to alternate between a first operating state and a second operating state to generate reciprocal motion of the magnetic shuttle 66. For example, the switches 98 and 100 are alternatingly actuated to so that the direction of the pressure differential in the fluid chamber 64 is repeatedly reversed. This causes the magnetic shuttle 66 move back and forth in a reciprocating motion.

In the fourth stage 204, the reciprocating motion of the magnetic shuttle 66 causes an alternating current to be generated in the one or more conductive coils 72.

In the fifth stage 205, electrical power is supplied by the power generation assembly 60 to one or more surface or downhole components. For example, the power generation assembly 60 is electrically connected to a downhole tool 30, sensor 32 and/or other downhole component to supply power thereto.

Set forth below are some embodiments of the foregoing disclosure:

Embodiment 1

An apparatus for generating electrical power, the apparatus comprising: at least one housing assembly including: a housing located at a tubular configured to be disposed in a borehole in a resource bearing formation, the tubular including a tubular conduit through which a borehole fluid is circulated, the housing including a fluid chamber configured to receive the borehole fluid; one or more conductive coils surrounding the fluid chamber; and a reciprocating magnetic shuttle disposed in the fluid chamber and dividing the fluid chamber into a first volume and a second volume; a first conduit connected to the first volume, and a second conduit connected to the second volume, the first conduit and the second conduit extending from the tubular conduit to an annulus in the borehole; and at least one switching assembly configured to alternate between a first operating state and a second operating state, wherein the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state, wherein the switching assembly is configured to alternate between the first operating state and the second operating state to alternate a direction of a differential pressure between the first volume and the second volume and cause the magnetic shuttle to move in a reciprocating motion and generate an electric current in the one or more conductive coils.

Embodiment 2

The apparatus of any prior embodiment, further comprising an electrical connector configured to supply electrical power to a downhole component from the one or more conductive coils.

Embodiment 3

The apparatus of any prior embodiment, further comprising a first valve disposed in the first conduit and a second valve disposed in the second conduit, the first valve and the second valve operable to switch between the first operating state and the second operating state.

Embodiment 4

The apparatus of any prior embodiment, further comprising at least one switching device configured to control the first valve and the second valve.

Embodiment 5

The apparatus of any prior embodiment, wherein the at least one switching device is configured to be powered by at least some of the electric current.

Embodiment 6

The apparatus of any prior embodiment, wherein the at least one switching device is configured to operate the first valve and the second valve to switch between the first operating state and the second operating state in response to a periodic signal or command.

Embodiment 7

The apparatus of any prior embodiment, wherein the at least one switching device includes a first switching device configured to control the first valve and a second switching device configured to control the second valve.

Embodiment 8

The apparatus of any prior embodiment, wherein the first switching device and the second switching device are configured to be actuated based on at least one of a mechanical contact and an electrical contact between the first switching device or the second switching device and the magnetic shuttle.

Embodiment 9

The apparatus of any prior embodiment, wherein the first switching device and the second switching device are configured to be actuated based on the magnetic shuttle being in proximity to the first switching device or the second switching device.

Embodiment 10

The apparatus of any prior embodiment, wherein the first switching device and the second switching device are configured to be actuated based on an increase in fluid pressure on the first switching device or the second switching device caused by the magnetic shuttle moving toward the first switching device or the second switching device.

Embodiment 11

The apparatus of any prior embodiment, further comprising one or more additional housing assemblies connected to the first conduit and the second conduit, each additional housing assembly having a respective fluid chamber and a respective reciprocating magnetic shuttle, wherein each of the at least one housing assembly and the one or more additional housing assemblies are operated in parallel to generate electric power.

Embodiment 12

A method of generating electrical power, the apparatus comprising: deploying a power generation assembly with a tubular in a borehole in a resource bearing formation, the tubular including a tubular conduit through which a borehole fluid is circulated, the power generation assembly including at least one housing assembly having a housing located at the tubular, the housing including a fluid chamber configured to receive the borehole fluid, one or more conductive coils surrounding the fluid chamber, and a reciprocating magnetic shuttle disposed in the fluid chamber and dividing the fluid chamber into a first volume and a second volume; connecting a first conduit to the first volume, and connecting a second conduit to the second volume, the first conduit and the second conduit extending from the tubular conduit to an annulus in the borehole; operating at least one switching assembly to alternate between a first operating state and a second operating state, wherein the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state; and causing the magnetic shuttle to move within the fluid chamber in a reciprocating motion by alternating between the first operating state and the second operating state to alternate a direction of a differential pressure between the first volume and the second volume, and generating an electric current in the one or more conductive coils.

Embodiment 13

The method of any prior embodiment, further comprising supplying electrical power to a downhole component from the one or more conductive coils.

Embodiment 14

The method of any prior embodiment, wherein the power generation assembly further includes a first valve disposed in the first conduit and a second valve disposed in the second conduit, the first valve and the second valve operable to switch between the first operating state and the second operating state.

Embodiment 15

The method of any prior embodiment, wherein operating the switching assembly includes controlling the first valve and the second valve by at least one switching device.

Embodiment 16

The method of any prior embodiment, wherein the at least one switching device is configured to be powered by at least some of the electric current, and operating the switching assembly includes sending a periodic signal or command to the at least one switching device to switch between the first operating state and the second operating state.

Embodiment 17

The method of any prior embodiment, wherein the at least one switching device includes a first switching device configured to control the first valve and a second switching device configured to control the second valve.

Embodiment 18

The method of any prior embodiment, wherein operating the switching assembly includes actuating the first switching device and the second switching device in response to at least one of a mechanical contact and an electrical contact between the first switching device or the second switching device and the magnetic shuttle.

Embodiment 19

The method of any prior embodiment, wherein operating the switching assembly includes actuating the first switching device and the second switching device in response to the magnetic shuttle being in proximity to the first switching device or the second switching device.

Embodiment 20

The method of any prior embodiment, wherein operating the switching assembly includes actuating the first switching device and the second switching device in response to an increase in fluid pressure on the first switching device or the second switching device caused by the magnetic shuttle moving toward the first switching device or the second switching device.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An apparatus for generating electrical power, the apparatus comprising:
    at least one housing assembly including:
        a housing located at a tubular configured to be disposed in a borehole in a resource bearing formation, the tubular including a tubular conduit through which a borehole fluid is circulated, the housing including a fluid chamber configured to receive the borehole fluid;
        one or more conductive coils surrounding the fluid chamber; and
        a reciprocating magnetic shuttle disposed in the fluid chamber and dividing the fluid chamber into a first volume and a second volume;
    a first conduit connected to the first volume, and a second conduit connected to the second volume, the first conduit and the second conduit extending from the tubular conduit to an annulus in the borehole; and
    at least one switching assembly configured to alternate between a first operating state and a second operating state, wherein the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state,
    wherein the switching assembly is configured to alternate between the first operating state and the second operating state to alternate a direction of a differential pressure between the first volume and the second volume and cause the magnetic shuttle to move in a reciprocating motion and generate an electric current in the one or more conductive coils, the switching assembly including at least one switching device configured to control the direction of the differential pressure based on at least one of: an axial location of the magnetic shuttle in the fluid chamber being within a proximity of the at least one switching device, a mechanical contact between the at least one switching device and the magnetic shuttle, an electrical contact between the at least one switching device and the magnetic shuttle, and an increase in fluid pressure on the at least one switching device caused by movement of the magnetic shuttle toward the at least one switching device.

2. The apparatus of claim 1, further comprising an electrical connector configured to supply electrical power to a downhole component from the one or more conductive coils.

3. The apparatus of claim 1, further comprising a first valve disposed in the first conduit and a second valve disposed in the second conduit, the first valve and the second valve operable to switch between the first operating state and the second operating state.

4. The apparatus of claim 3, further comprising at least one switching device configured to control the first valve and the second valve.

5. The apparatus of claim 4, wherein the at least one switching device is configured to be powered by at least some of the electric current.

6. The apparatus of claim 4, wherein the at least one switching device is configured to operate the first valve and the second valve to switch between the first operating state and the second operating state in response to a periodic signal or command.

7. The apparatus of claim 3, wherein the at least one switching device includes a first switching device configured to control the first valve and a second switching device configured to control the second valve.

8. The apparatus of claim 7, wherein the first switching device and the second switching device are configured to be actuated based on at least one of a mechanical contact and an electrical contact between the first switching device or the second switching device and the magnetic shuttle.

9. The apparatus of claim 7, wherein the first switching device and the second switching device are configured to be actuated based on the magnetic shuttle being in proximity to the first switching device or the second switching device.

10. The apparatus of claim 7, wherein the first switching device and the second switching device are configured to be actuated based on an increase in fluid pressure on the first switching device or the second switching device caused by the magnetic shuttle moving toward the first switching device or the second switching device.

11. The apparatus of claim 1, further comprising one or more additional housing assemblies connected to the first conduit and the second conduit, each additional housing assembly having a respective fluid chamber and a respective reciprocating magnetic shuttle, wherein each of the at least one housing assembly and the one or more additional housing assemblies are operated in parallel to generate electric power.

12. A method of generating electrical power, the method comprising:
deploying a power generation assembly with a tubular in a borehole in a resource bearing formation, the tubular including a tubular conduit through which a borehole fluid is circulated, the power generation assembly including at least one housing assembly having a housing located at the tubular, the housing including a fluid chamber configured to receive the borehole fluid, one or more conductive coils surrounding the fluid chamber, and a reciprocating magnetic shuttle disposed in the fluid chamber and dividing the fluid chamber into a first volume and a second volume;
connecting a first conduit to the first volume, and connecting a second conduit to the second volume, the first conduit and the second conduit extending from the tubular conduit to an annulus in the borehole;
operating at least one switching assembly to alternate between a first operating state and a second operating state, wherein the first volume is in fluid communication with the annulus via the first conduit and the second volume is in fluid communication with the tubular conduit via the second conduit when the switching assembly is in the first operating state, and the first volume is in fluid communication with the tubular conduit via the first conduit and the second volume is in fluid communication with the annulus via the second conduit when the switching assembly is in the second operating state; and
causing the magnetic shuttle to move within the fluid chamber in a reciprocating motion by alternating between the first operating state and the second operating state to alternate a direction of a differential pressure between the first volume and the second volume, and generating an electric current in the one or more conductive coils, the direction of the differential pressure controlled by actuating at least one switching device based on at least one of: an axial location of the magnetic shuttle in the fluid chamber being within a proximity of the at least one switching device, a mechanical contact between the at least one switching device and the magnetic shuttle, an electrical contact between the at least one switching device and the magnetic shuttle, and an increase in fluid pressure on the at least one switching device caused by movement of the magnetic shuttle toward the at least one switching device.

13. The method of claim 12, further comprising supplying electrical power to a downhole component from the one or more conductive coils.

14. The method of claim 12, wherein the power generation assembly further includes a first valve disposed in the first conduit and a second valve disposed in the second conduit, the first valve and the second valve operable to switch between the first operating state and the second operating state.

15. The method of claim 14, wherein operating the switching assembly includes controlling the first valve and the second valve by at least one switching device.

16. The method of claim 15, wherein the at least one switching device is configured to be powered by at least some of the electric current, and operating the switching assembly includes sending a periodic signal or command to the at least one switching device to switch between the first operating state and the second operating state.

17. The method of claim 15, wherein the at least one switching device includes a first switching device configured to control the first valve and a second switching device configured to control the second valve.

18. The method of claim 17, wherein operating the switching assembly includes actuating the first switching device and the second switching device in response to at least one of a mechanical contact and an electrical contact between the first switching device or the second switching device and the magnetic shuttle.

19. The method of claim 17, wherein operating the switching assembly includes actuating the first switching device and the second switching device in response to the magnetic shuttle being in proximity to the first switching device or the second switching device.

20. The method of claim 17, wherein operating the switching assembly includes actuating the first switching device and the second switching device in response to an increase in fluid pressure on the first switching device or the second switching device caused by the magnetic shuttle moving toward the first switching device or the second switching device.

* * * * *